US012773842B2

(12) United States Patent
Berthe et al.

(10) Patent No.: US 12,773,842 B2
(45) Date of Patent: Oct. 27, 2026

(54) LAMINATED GLAZING FOR A MOTOR VEHICLE, IN PARTICULAR LATERAL GLAZING FOR A VEHICLE DOOR

(71) Applicant: SAINT-GOBAIN GLASS FRANCE, Courbevoie (FR)

(72) Inventors: Frédéric Berthe, Cambronne les Ribecourt (FR); Xavier Drouet, Marly la Ville (FR)

(73) Assignee: SAIBT-GOBAIN SEKURIT FRANCE, Thourotte (FR)

( * ) Notice: Subject to any disclaimer, the term of this patent is extended or adjusted under 35 U.S.C. 154(b) by 789 days.

(21) Appl. No.: 17/791,116

(22) PCT Filed: Jan. 11, 2021

(86) PCT No.: PCT/FR2021/050040

§ 371 (c)(1),
(2) Date: Jul. 6, 2022

(87) PCT Pub. No.: WO2021/144524

PCT Pub. Date: Jul. 22, 2021

(65) Prior Publication Data

US 2023/0032579 A1 Feb. 2, 2023

(30) Foreign Application Priority Data

Jan. 16, 2020 (FR) ........................................ 2000390

(51) Int. Cl.
*B32B 17/10* (2006.01)
*B32B 3/08* (2006.01)
*B32B 3/26* (2006.01)

(52) U.S. Cl.
CPC .......... *B32B 17/10779* (2013.01); *B32B 3/08* (2013.01); *B32B 3/266* (2013.01);
(Continued)

(58) Field of Classification Search
CPC ..... B32B 17/10779; B32B 3/08; B32B 3/266; B32B 17/10036; B32B 17/10293;
(Continued)

(56) References Cited

U.S. PATENT DOCUMENTS

2011/0272219 A1 11/2011 Fried et al.
2019/0270285 A1 9/2019 Gillessen et al.
(Continued)

FOREIGN PATENT DOCUMENTS

CN 1671942 A 9/2005
CN 102143903 A 8/2011
(Continued)

OTHER PUBLICATIONS

International Search Report as issued in International Patent Application No. PCT/FR2021/050040, dated Apr. 22, 2021.

*Primary Examiner* — Brian Handville
(74) *Attorney, Agent, or Firm* — CUSHMAN PARTNERS LLC

(57) ABSTRACT

A laminated glazing for a motor vehicle, notably side glazing intended to be slidingly mounted in a door of the vehicle, includes at least one outer sheet of glass and one inner sheet of glass joined together by an interlayer which includes at least one sheet of polymer material, in which a visible zone and a non-visible zone of the glazing extend on either side of a limit of visibility and including, in the non-visible zone situated below the limit of visibility, at least one fixing part which includes at least one fixing hole intended to receive a link system with a driving device of the glazing and at least one insert including an orifice configured to be aligned with the fixing hole, wherein the insert includes at least one part which is interposed between the interlayer and one of the outer or inner one of the sheets of glass.

21 Claims, 8 Drawing Sheets

(52) U.S. Cl.
CPC .. *B32B 17/10036* (2013.01); *B32B 17/10293* (2013.01); *B32B 2307/732* (2013.01); *B32B 2605/006* (2013.01)

(58) Field of Classification Search
CPC ........ B32B 2307/732; B32B 2605/006; B32B 17/10761; B32B 17/1055; B32B 27/08; B32B 27/306; B32B 27/36; B60J 1/17
See application file for complete search history.

(56) References Cited

U.S. PATENT DOCUMENTS

| | | | | |
|---|---|---|---|---|
| 2019/0299752 | A1* | 10/2019 | Sadakane | ................. B60J 1/001 |
| 2020/0023618 | A1* | 1/2020 | Teranishi | .......... B32B 17/10036 |
| 2020/0114624 | A1 | 4/2020 | Mannheim Astete et al. | |

FOREIGN PATENT DOCUMENTS

| | | | | |
|---|---|---|---|---|
| CN | 104582954 | A | 4/2015 | |
| CN | 108260351 | A | 7/2018 | |
| CN | 110494284 | A | 11/2019 | |
| DE | 20 2017 006786 | U1 | 5/2018 | |
| EP | 1 540 123 | A1 | 6/2005 | |
| EP | 3 459 731 | A1 | 3/2019 | |
| WO | WO 2004/011755 | A1 | 2/2004 | |
| WO | WO 2014/029605 | A1 | 2/2014 | |
| WO | WO-2018123916 | A1 * | 7/2018 | ............. B32B 17/10 |
| WO | WO 2018/178882 | A1 | 10/2018 | |

* cited by examiner

LAMINATED GLAZING FOR A MOTOR VEHICLE, IN PARTICULAR LATERAL GLAZING FOR A VEHICLE DOOR

CROSS-REFERENCE TO RELATED APPLICATIONS

This application is the U.S. National Stage of PCT/FR2021/050040, filed Jan. 11, 2021, which in turn claims priority to French patent application number 2000390 filed Jan. 16, 2020. The content of these applications are incorporated herein by reference in their entireties.

TECHNICAL FIELD OF THE INVENTION

The invention relates to laminated glazing for a motor vehicle, notably side glazing for a vehicle door.

The invention relates more particularly to laminated glazing for a motor vehicle, notably side glazing intended to be slidingly mounted in a door of the vehicle, said glazing comprising at least one outer sheet of glass and one inner sheet of glass joined together by an interlayer which comprises at least one sheet of polymer material, in which a visible zone and a non-visible zone of the glazing extend on either side of a limit of visibility and comprising, in said non-visible zone situated below the limit of visibility, on the one hand, at least one fixing part which comprises at least one fixing hole intended to receive link means with a driving device of said glazing and, on the other hand, at least one insert which comprises an orifice configured to be aligned with said fixing hole.

The invention will be described more particularly for a use in the automobile field as side glazing slidingly mounted in the bodywork of a motor vehicle, in particular in a door of the vehicle, but is however not limited to such an application.

TECHNICAL BACKGROUND

Motor vehicle glazings are subject to performance levels that are ever more demanding and often difficult to reconcile, as is notably the case with side glazings.

In a motor vehicle, the side glazings are generally slidingly mounted via a driving device in the doors of the vehicle.

In some vehicles and for notably esthetic reasons, the doors do not include a frame around the side glazing, like in some convertibles, which helps to increase the glazing performance demands, in particular when it comes to safety in the event of impacts.

Such doors without a frame are often referred to in the motor vehicle field by the term “frameless”.

The driving device of the side glazing is controlled selectively via a member, such as a handle or a button, to move the glazing heightwise with respect to the door, respectively between a closed position and at least one open position.

The side glazings of a vehicle usually consist of more or less thick monolithic sheets of glass.

Compared to such a monolithic glazing, a laminated glazing comprises at least one outer sheet of glass and one inner sheet of glass joined together by an interlayer comprising at least one sheet of polymer material, such as at least one sheet of polyvinylbutyral (PVB).

The motor vehicle constructors want, notably for the most sophisticated vehicles, to have side glazings that offer the best existing properties such as qualities of acoustic attenuation, of resistance to forcible entry, a thermal properties, etc.

That is one of the reasons why the laminated glazings are increasingly used as side glazings of a motor vehicle. However, the use of laminated glazings is not without its problems.

One of the problems is notably how to be able to guarantee that the laminated glazing remains attached to the driving device in order to satisfy the safety requirements, particularly in the event of impacts, and do so even when the door does not include a frame, that is to say is of the “frameless” type.

To ensure the link between a side glazing and the driving device housed in the door, in the prior art, a first type of link implementing an assembly by pinching and a second type of link implementing an assembly by screwing are generally distinguished.

In the case of a link by pinching, the link means comprise, for example, a “Y” shaped link piece or pair of pieces, notably fixed by bonding to the glazing.

Each link piece (called “holder”) cooperates with each of the faces of the glazing, respectively inner and outer, said link piece being arranged in the vicinity of the bottom edge situated below the limit of visibility, in other words in the non-visible zone concealed in the door, and that is so in order to link the displacement of the side glazing to that of the driving device.

This first type of link by pinching is notably used for laminated glazings. However, this first type of link presents the drawback, for some applications, of an excessive bulk because that of the protruding link piece is added to the thickness of the glazing.

In addition, the link piece extends also heightwise, the zone of bonding of said link piece on the glass being superimposed on the fixing part of the glazing with the driving device.

Moreover, the standardization of the driving device is often sought by the motor vehicle constructors in order to be able to interchangeably fit a side glazing of monolithic type or of laminated type in the door of a vehicle, notably of the same model.

That is one of the reasons why it has also been sought to apply, to side glazings of laminated type, the second type of link by screwing, generally used with side glazings of monolithic type, and requiring the presence of at least one fixing hole in the glazing.

In the case of such a link by screwing, the glazing comprises at least one fixing part, sometimes two distinct fixing parts depending on the glazing, which are produced in the non-visible zone situated below the limit of visibility.

The fixing part or parts comprise at least one fixing hole formed through the glazing. The fixing hole emerging on both sides of the glazing is intended to receive link means, said link means generally comprising an axis linked to the driving device, for example a threaded rod.

The laminated glazing according to the present invention is intended to be used with such a link by screwing and therefore comprises, to this end, at least one fixing part comprising one or more fixing holes configured to receive link means with a driving device of the glazing.

In the laminated glazings used as side glazings, a particular type of glazing is distinguished, called “asymmetrical”, which is characterized by the fact that at least the inner sheet of glass, the shorter piece of glass, does not cover the other sheet or sheets of the glazing at the fixing part.

Thus, an asymmetrical glazing comprises an inner sheet of glass which is not passed through by link means between the glazing and the driving device since said inner sheet of glass does not have any fixing holes.

Consequently and mechanically, the inner sheet of glass of such an asymmetrical glazing is linked to the driving device only via the other sheets of the glazing, that is to say indirectly via the interlayer because of the assembly of the constituent sheets of the laminated glazing.

Such an asymmetrical laminated glazing is therefore attached to the driving device essentially by the outer sheet of glass. However, in the event of impact, the fixing part of the glazing undergoes stresses capable of provoking the breaking thereof around the fixing hole and thereby compromising the retention of the glazing via the link means.

In fact, that also constitutes a safety problem which will be explained more particularly hereinbelow through different examples of laminated glazing of asymmetrical type according to the prior art.

In the prior art, various examples of production of a laminated glazing of asymmetrical type are known that comprise at least one fixing part formed, excluding the inner sheet of glass, by all or part of the other constituent sheets of the glazing.

The document WO-2014/029605 (in the name of AGC) illustrates a first example of production in which the laminated glazing of asymmetrical type comprises, in its non-visible zone, a single fixing part with a single fixing hole.

In this first example, the fixing part of the glazing is additionally formed only by the outer sheet of glass, not covered at the fixing hole by the interlayer (or by the inner sheet of glass).

Thus, the asymmetrical glazing according to this first example is characterized by the fact that the interlayer and the inner sheet of glass are both shorter than the outer sheet of glass, said outer sheet centrally comprising a protuberance to form the fixing part of the glazing.

A laminated glazing according to this first example of production does not give full satisfaction concerning safety for a motor vehicle application, particularly as side glazing, for the reasons explained hereinbelow.

In fact, the fixing part formed by the outer sheet of glass is likely, for example in the event of impacts occurring during an accident, to break, notably at the fixing part and more specifically the fixing hole.

Consequently, if the glazing is no longer attached, linked to the driving device, the safety risk is that the glazing (which is no longer retained) is then transformed into a projectile capable of provoking damage, notably, but not exclusively, to people located in proximity.

Furthermore, it should be noted that this risk is even more acute when the glazing is used as side glazing in a motor vehicle door not including a frame because there is no frame then capable of retaining glazing.

In addition, such a laminated glazing also proves to be ill suited for a use as side glazing in such a frameless door, and that is particularly so because of the particular mechanical stresses, such as the forces occurring in a slamming maneuver of the door for it to be closed, also potentially resulting in a break at the fixing hole.

The document WO-2018/178882 (in the name of AGP) illustrates a second example of production in which the laminated glazing comprises, in its non-visible zone, a fixing part comprising two, front and rear, fixing holes when the glazing is intended to be used as side glazing.

In this second example, the fixing part of the glazing is formed by the outer sheet of glass and by a sheet of thermoplastic material forming the interlayer, typically a sheet of polyvinylbutyral (PVB).

In this asymmetrical laminated glazing, the fixing part of the glazing is not covered by the inner sheet of glass which, comprising a cutout, is shorter in height than the other sheets of the glazing and does not therefore extend to the fixing holes.

Compared to the first example, the resistance of the fixing part is enhanced by the addition of the interlayer sheet to the outer sheet of glass and by that of an insert.

In fact, in this second example, the glazing comprises an insert provided with a hole which is aligned with the fixing hole formed through the outer sheet of glass and the interlayer sheet made of polymer material. The insert is arranged in the cutout, that is to say below the inner sheet of glass.

According to the examples of production, the insert is fixed to the outer sheet of glass via the interlayer sheet made of polymer material (interposed between the two outer and inner sheets) or, in a variant, by bonding using an adhesive.

The improvement obtained in terms of safety in the event of breakage of the fixing part does however remain inadequate because it is notably limited to the resistance to tearing of the interlayer sheet made of polyvinylbutyral (PVB).

In the example of production of the glazing illustrated in FIG. 9A of the document, the inner sheet of glass is not linked to the insert, a space being notably present between them.

Thus, the inner sheet is itself not directly retained in the event of impacts, the inner sheet being only linked to the driving device by the interlayer sheet that ensures its assembly with the outer sheet.

In the example of production of the glazing illustrated in FIG. 9B of the document, the insert is linked to the inner sheet of glass by bonding, notably via a lug of the insert which cooperates with the inner face of the inner sheet of glass.

However, the improvement resulting from the fixing by bonding between the lug of the insert and the inner sheet of glass remains limited.

Above all, such a lug locally forms an overthickness, a swelling, with respect to the inner sheet so that the insert according to the example of production of FIG. 9B presents the drawback of increasing the bulk of the glazing.

Now, the bulk of the laminated glazing is, for side glazing, an important characteristic given its location in the limited space that a door of a motor vehicle constitutes.

Moreover, the bulk of the glazing is also an important characteristic when interchangeability between a side glazing of laminated type and a side glazing of monolithic type is desired by the motor vehicle constructor in order to standardize the link means and the associated driving device.

Thus, in addition to these drawbacks, the safety obtained with such laminated glazing remains inadequate to guarantee that, in the event of breakage at the fixing part, the laminated glazing will remain well attached to the driving device via the link means received in the fixing hole and thereby will not be likely to be transformed into a projectile capable of provoking damage.

That is why, with regard to safety, a laminated glazing according to this second example offers little more than an inadequate improvement over a glazing according to the first example and therefore does not constitute a satisfactory solution for a motor vehicle application.

One of the aims of the present invention is notably to remedy the drawbacks of the prior art, the invention more particularly and preferentially targeting a laminated glazing offering enhanced safety in the event of impact capable of provoking the breaking of the fixing part, notably when said glazing is used as side glazing in a frameless door of a motor vehicle.

SUMMARY OF THE INVENTION

To this end, the invention proposes a laminated glazing of the type described previously, characterized in that said insert comprises at least one part which is interposed between the interlayer and an outer or inner one of said sheets of glass.

Advantageously, said at least one insert according to the invention is included in the glazing, the insert extending at least partially inside the glazing, between the outer sheet of glass and the inner sheet of glass, so as to secure the attachment of the glazing.

Advantageously, the function of the insert according to the invention is to transmit to the link means the forces occurring notably in the event of impacts and, more particularly, in the fixing part, so as to guarantee the retention of the laminated glazing.

With such an insert, the glazing can be retained by the link means, in particular in the event of breakage, following one or more impacts, occurring at the fixing part formed by at least the outer sheet of glass.

Advantageously, the incorporation of at least one insert thus makes it possible to increase the safety of use of laminated glazing as side glazing by avoiding, in particular, the glazing being able to be transformed into a projectile, notably, but not exclusively, when this glazing is mounted in a frameless door.

Advantageously, the insert is arranged only in the non-visible zone of the glazing so that the material forming the insert can be chosen freely, notably as a function of its mechanical strength characteristics.

Advantageously, the insert makes it possible to reinforce, locally at the fixing part, the strength of the glazing. By comparison with the second exemplary production according to the prior art, said strength is in fact no longer limited to the resistance to tearing of the interlayer, i.e. that of the PVB.

According to other features of the invention:

- said at least one part of the insert extends in the non-visible zone covered by the inner sheet of glass;
- said at least one part of the insert is juxtaposed with the interlayer;
- said at least one part of the insert extends parallel to an inner face of the outer or inner one of said sheets of glass;
- said at least one part of the insert comprises at least one aperture so as to obtain, through said at least one part of the insert, at least one fixing area between the interlayer and the outer sheet of glass or the inner sheet of glass, directly or indirectly adjacent to the interlayer;
- said at least one part of the insert extending in the glazing, between the interlayer and one of the outer or inner ones of said sheets of glass, has a surface area which is greater than that of the opposite part comprising said orifice;
- said at least one part of the insert has a thickness of between 0.03 mm and 0.35 mm, preferably of between 0.05 mm and 0.2 mm;
- said insert is made of plastic material, for example polyethylene terephthalate, or of metal, for example steel;
- the orifice of said insert is of circular form, said circular orifice having a diameter which is greater than or equal to that of said fixing hole passed through by said link means;
- at least one part forming a patch is interposed between the insert and the outer sheet of glass or the inner sheet of glass;
- said part forming a patch is made of polymer material, for example a film of polyvinylbutyral;
- said part forming a patch comprises an orifice configured to be aligned with the fixing hole passed through by said means;
- said at least one fixing part of the glazing comprises at least the outer sheet of glass, not covered by the interlayer and by the inner sheet of glass;
- said at least one fixing part of the glazing comprises at least the outer sheet of glass and at least one of the sheets forming said interlayer, respectively not covered by the inner sheet of glass;
- said at least one fixing part of the glazing comprises the outer sheet of glass, the interlayer and the inner sheet of glass.

BRIEF DESCRIPTION OF THE FIGURES

Other features and advantages of the invention will become apparent on reading the following detailed description, for an understanding of which reference will be made to the attached drawings in which.

DETAILED DESCRIPTION OF THE INVENTION

Figure 1:
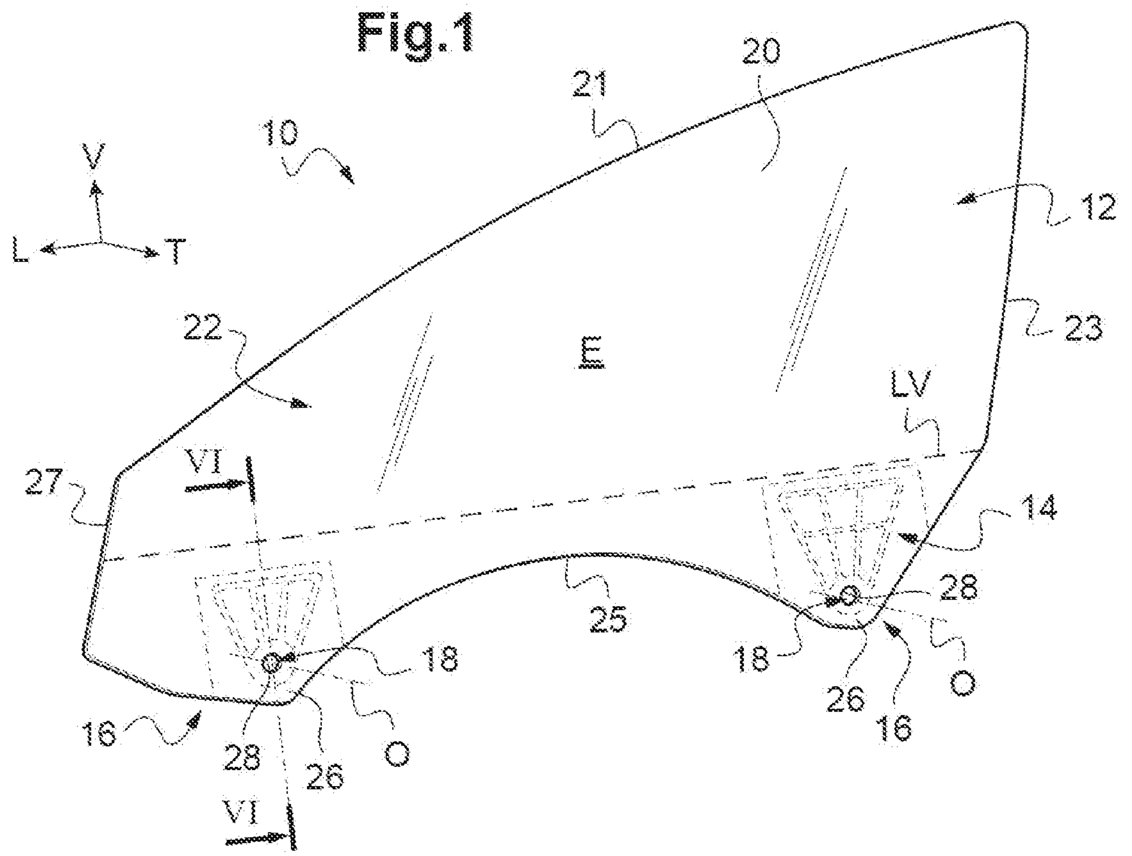
FIG. 1 is a perspective view which represents, from the outside, a laminated glazing for a motor vehicle according to a first embodiment, notably a side glazing of asymmetrical type intended to be slidingly mounted in a door, and which illustrates the outer sheet of glass of the laminated glazing comprising, in its non-visible zone, two, front and rear, fixing parts each provided with a fixing hole intended to receive link means with a glazing driving device.

In the following detailed description, the longitudinal, vertical and transverse orientations will be used in a non-limiting manner with reference to the trihedron (L, V, T) represented in the figures.

By convention, in the description, the terms "front" and "rear" will be used with reference to the longitudinal orientation, the terms "top" and "bottom", or "high" and "low" will be used with reference to the vertical orientation and the terms "outer" and "inner" or "external" and "internal" will be used with reference to the transverse orientation of said trihedron (L, V, T).

Hereinafter in the description, the embodiments and/or variants of the invention will advantageously be described by comparison and, in the figures, elements that have similar functions or identical structures will be designated by the same reference.

FIGS. 1 to 6 represent a first embodiment of a laminated glazing 10 for a motor vehicle according to the invention.

The laminated glazing 10 according to the invention will be described by way of nonlimiting example in the context of an application as side glazing.

Side glazing is intended to be slidingly mounted, according to the vertical orientation, in a door (not represented) of the vehicle. The side glazing is intended to close an aperture which is formed in the door of the vehicle.

In such a application for a motor vehicle, the glazing 10 then produces a separation between a space E which is outside the vehicle and an interior space I which is inside the vehicle. Thus, the terms "outer" and "inner" applied hereinbelow to the laminated glazing 10 are in accordance with this concept of exterior and interior space.

The laminated glazing 10 according to the first embodiment will be described more particularly with reference to FIGS. 1 to 3 which illustrate said laminated glazing 10 in perspective, successively seen from the outside, from the inside and in an exploded view.

The laminated glazing 10 comprises a zone 12, said to be visible, and a zone 14, said to be non-visible, which extend on either side of a limit of visibility LV of the glazing, the non-visible zone 14 corresponding to a bottom part of the glazing concealed permanently in the door.

The figures represent the limit of visibility LV by dotted lines in order to show it, said limit of visibility LV generally corresponding to a window sealing strip securely mounted on the door.

Such a sealing strip is arranged so as to cooperate with the laminated glazing 10, in particular when said glazing 10 slides relative to the door.

The laminated glazing 10 comprises, in said non-visible zone 14 situated below the limit of visibility LV, at least one fixing part 16 which comprises at least one fixing hole 18 intended to receive link means linking the glazing 10 with a driving device (not represented) of said glazing 10.

The laminated glazing 10 comprises at least one fixing hole 18 which has an axis 0 of transverse orientation.

The link means between the glazing 10 and the driving device comprise, for example, at least one shaft intended to pass through the fixing part 16 of the glazing 10 and do so through said at least one fixing hole 18, which fixing hole 18 has a tubular form.

As is known, the driving device (also called "window lift") is controlled selectively to displace, by a translational movement, said glazing 10 heightwise between at least one high position, called position of closure of the aperture of the door and one low position, called position of opening of all or part of said aperture.

According to the first embodiment, the laminated glazing 10 here comprises two fixing parts 16, respectively a first fixing part 16 situated at the front and a second fixing part 16 situated at the rear.

The first and second fixing parts 16 are, for example, formed by protuberances, separated from one another according to the longitudinal orientation. Each of said first and second fixing parts 16 comprises at least one fixing hole 18.

In a variant not represented, the laminated glazing 10 comprises a single fixing part 16, said fixing part 16 then comprising, for example, two fixing holes 18 spaced apart from one another according to the longitudinal direction.

The number of fixing parts 16 of the glazing 10 is, like the form thereof, determined according to the application, that is to say the motor vehicle, just as the number of fixing holes 18 is determined according to the glazing driving device.

According to the applications and as recalled in the preamble, the laminated glazing 10 is movably mounted in a vehicle door which may or may not have a frame delimiting the aperture intended to be closed by the laminated glazing 10.

The absence of such a door frame adds to the problems in terms of safety, since no frame can in particular contribute to retaining the glazing 10 in the event of impacts, for example in an accident.

Indeed, when used as side glazing mounted in a door, a laminated glazing 10 has to remain linked to the door, notably attached to the driving device by means of the link means which are mounted in the fixing hole or holes 18 of the glazing 10.

The laminated glazing 10 must therefore address safety demands in order not to risk being transformed into a projectile in the event of breakage of the fixing part because, then, such free glazing would be likely to provoke damage, notably, but not exclusively, to the occupants of the vehicle.

That is why, in the event of cracking or breaking of the laminated glazing 10 occurring at the fixing part or parts 16 linked to the door (with or without frame), it is essential to be able to guarantee that the glazing cannot be separated and will always remain attached to the driving device via the link means.

Figure 2:
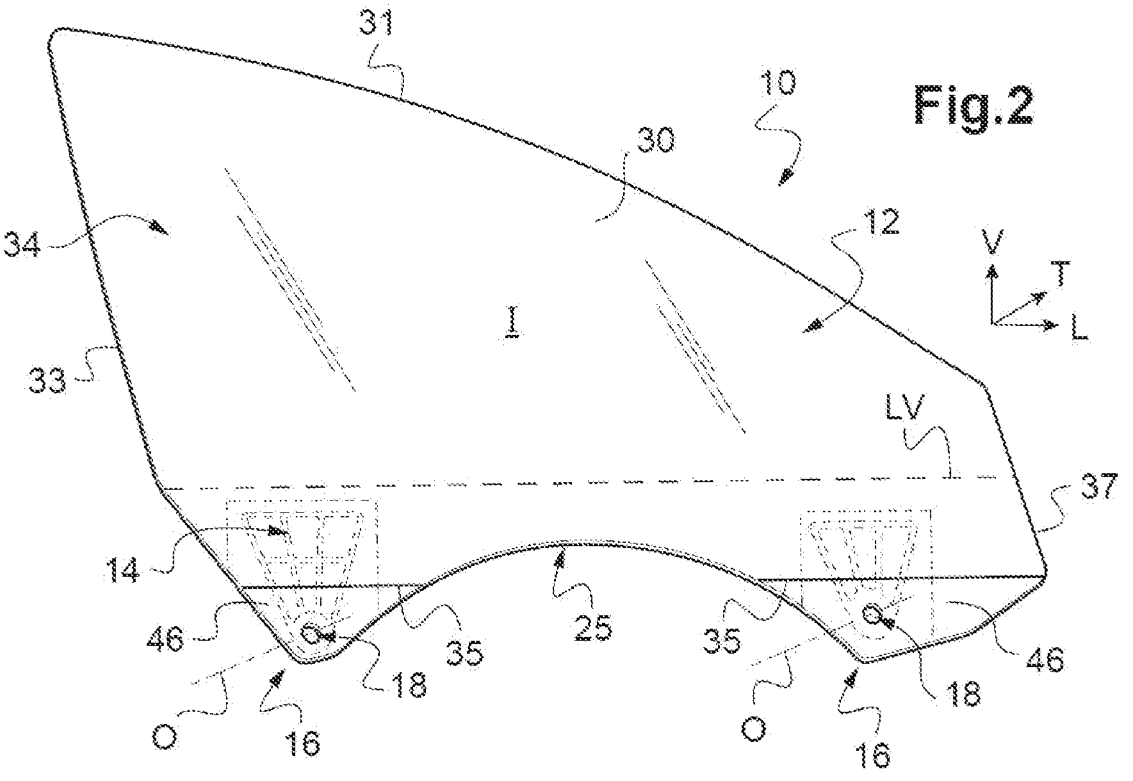
FIG. 2 is a perspective view which represents, from the inside, the laminated glazing according to FIG. 1 and which also illustrates the two fixing parts of the laminated glazing not covered by the inner sheet of glass.
Figure 3:
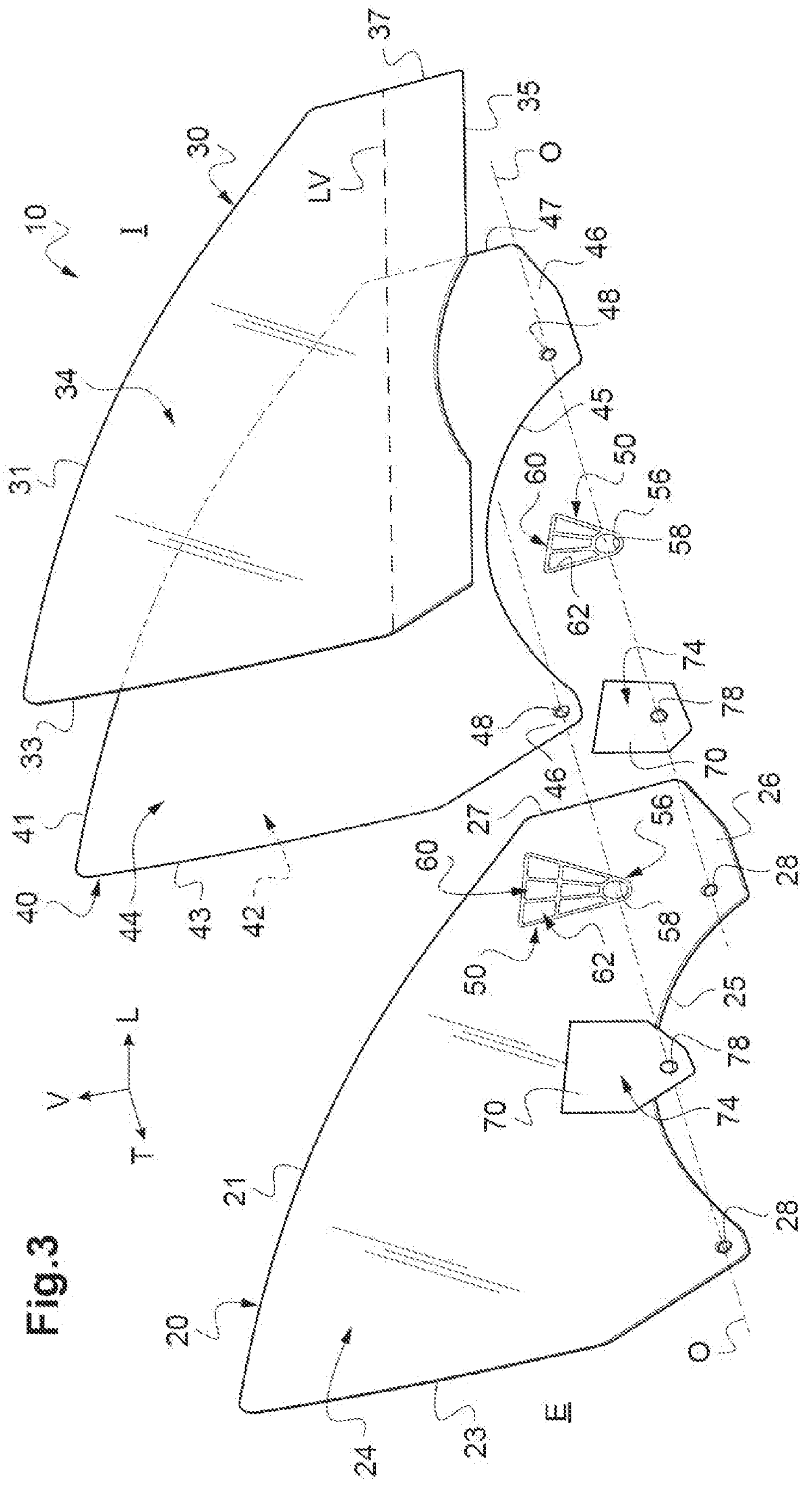
FIG. 3 is an exploded perspective view which represents the laminated glazing according to FIGS. 1 and 2, and which illustrates at least one insert and one patch which, when arranged in each of the fixing parts of the glazing, are interposed between the interlayer and the outer sheet of glass, the insert and the patch being made visible by transparency in FIGS. 1 and 2.

As illustrated in FIGS. 1 to 3 in particular, the laminated glazing 10 comprises at least one outer sheet of glass 20 and one inner sheet of glass 30 which are assembled via an interlayer 40.

The laminated glazing 10 used here as side glazing is delimited by a perimeter of overall parallelepipedal form.

The outer sheet of glass 20 comprises an outer face 22 and an inner face 24, respectively oriented toward the outside space E and toward the interior space I.

As illustrated in FIG. 1, the outer sheet of glass 20 comprises, in succession, a top edge 21, a rear edge 23, a bottom edge 25 and a front edge 27, said opposing top edge 21 and bottom edge 25 extending overall according to the longitudinal orientation and said opposing rear edge 23 and front edge 27 extending overall according to the vertical orientation.

The outer sheet of glass 20 comprises, at the bottom edge 25, at least one protuberance 26 intended to form all or at least a part of said at least one fixing part 16 of the laminated glazing 10.

Preferably and as illustrated in FIGS. 1 to 3, the outer sheet of glass 20 comprises two protuberances 26 which are respectively situated at the front and at the rear of the glazing 10.

The bottom edge 25 of the outer sheet of glass 20 has, centrally, a curvilinear section forming a downward-oriented concave profile.

The outer sheet of glass 20 comprises, in each of said protuberances 26, a hole 28 passing through it and having an axis which is coaxial to the axis O of the fixing hole 18 of the glazing.

According to embodiments of the laminated glazing 10, the hole 28 forms all or a part of said fixing hole 18, after the assembly of the various sheets of the glazing 10.

Indeed, depending on the type of laminated glazing 10, symmetrical or asymmetrical, said at least one fixing part 16 is composed of all or just a part of the sheets forming said glazing 10.

The inner sheet of glass 30 comprises an outer face 32 and an inner face 34, respectively oriented toward the outside space E and toward the interior space I.

As illustrated in FIG. 2, the inner sheet of glass 30 comprises, in succession, a top edge 31, a rear edge 33, a bottom edge 35 and a front edge 37, said opposing top edge 31 and bottom edge 35 extending overall according to the longitudinal orientation and said opposing rear edge 33 and front edge 37 extending overall according to the vertical orientation.

The laminated glazing 10 illustrated in FIGS. 1 to 3 is a glazing of asymmetrical type, that is to say a glazing in which at least the inner sheet of glass 30 is shorter in height than the outer sheet of glass 20.

In this first embodiment, the fixing parts 16 of the glazing 10 consist of the outer sheet of glass 20 and the interlayer 40 as FIGS. 1 to 3 illustrate.

Preferably, the inner sheet of glass 30 is thinner than the outer sheet of glass 20, that is to say has, according to the transverse orientation, a thickness "e30" which is less than a thickness "e20" of the outer sheet of glass 20.

In a variant not represented, the inner sheet of glass 30 and the outer sheet of glass 20 are of the same thickness.

Although shorter, the inner sheet of glass 30 extends into the non-visible part 14, that is to say below the limit of visibility LV. The inner sheet of glass 30 here has substantially a strip whose height can vary longitudinally between the rear and the front, said height being included between the limit of visibility LV and the bottom edge 35.

Preferably, the bottom edge 35 comprises a profile partly complementing that of the bottom edge 25 of the outer sheet of glass 20. Thus, the bottom edge 35 of the inner sheet of glass 30 has, centrally, a curvilinear section forming a downward-oriented concave profile.

The interlayer 40 comprises at least one sheet of polymer material, the interlayer 40 linking together the outer sheet of glass 20 and the inner sheet of glass 30 of the glazing 10.

In this first embodiment, the interlayer 40 comprises a sheet of polymer material. Preferably, said sheet of polymer material forming the interlayer 40 is a sheet of polyvinylbutyral (PVB).

In a variant not represented, the interlayer 40 comprises more than one sheet of polymer material, the interlayer 40 being, for example, formed by a multilayer structure.

An interlayer 40 according to this variant comprises, for example, at least three layers of polymer material, respectively a so-called interlayer sheet which is interposed between two other sheets.

Advantageously, the interlayer 40 is a structure of trilayer type comprising at least one interlayer sheet of polyethylene terephthalate (PET), which is interposed between two sheets of polyvinylbutyral (PVB).

As illustrated in FIG. 3, the interlayer 40 comprises an outer face 42 situated facing the inner face 24 of the outer sheet of glass 20 and an inner face 44 situated facing the outer face 32 of the inner sheet of glass 30.

The interlayer 40 comprises, in succession, a top edge 41, a rear edge 43, a bottom edge 45 and a front edge 47, said opposing top edge 41 and bottom edge 45 extending overall according to the longitudinal orientation and said opposing rear edge 43 and front edge 47 extending overall according to the vertical orientation.

The laminated glazing 10 according to the first embodiment is a glazing of asymmetrical type in which the interlayer 40 is identical to the outer sheet of glass 20 so that only the inner sheet of glass 30 is, here, shorter in height and thus does not cover the fixing parts 16 of the glazing.

Like the outer sheet of glass 20, the interlayer 40 comprises two protuberances 46 which, protrudingly extending from the bottom edge 45, each comprise a hole 48 which is a through-hole and has an axis which is coaxial to the axis O of the fixing hole 18 of the glazing 10.

The fixing parts 16 of the glazing 10 according to the first embodiment therefore also comprise the protuberances 26 of the outer sheet of glass 20 and the protuberances 46 of the interlayer 40, while each of the fixing holes 18 of axis O is formed at least by the hole 28 formed through the outer sheet of glass 20 and the hole 48 formed through the interlayer 40.

Preferably, the fixing hole 18 of the laminated glazing 10 internally receives a sleeve (not represented) which is fixed to the glazing 10, for example by bonding, said sleeve notably making it possible to make up for defects of coaxial alignment between the holes 28, 48 and to facilitate placement of the link means.

The laminated glazing 10 comprises, in said non-visible zone 14 situated below the limit of visibility LV, at least one insert 50 arranged in each of the front and rear fixing parts 16, said inserts 50 arranged respectively at the front and the rear are more particularly visible in FIGS. 4 and 5.

The insert 50 comprises an outer face 52 and an inner face 54. Preferably, the insert 50 is a thin part such as a plate.

In the free state, that is to say before its insertion into the glazing 10, the faces 52 and 54 of the insert 50 are overall flat.

Advantageously, the insert 50 can be deformed to then follow, depending on its arrangement, the possible curvature of the glazing such as the curvature that a side glazing generally has and which is, for example, determined by at least one primary radius.

The outer face 52 and the inner face 54 of the insert 50 thus extend parallel to the face situated opposite, such as the inner face 24 of the outer sheet of glass 20 for the outer face 52 and the outer face 42 of the interlayer 40 for the inner face 54 according to the first embodiment.

The insert 50 functionally comprises a first part 56, called bottom part, comprising an orifice 58 which is configured to be aligned with the axis O of said fixing hole 18 of the glazing 10.

Preferably, the orifice 58 of said insert 50 is of circular form, said circular orifice 58 having a diameter which is greater than or equal to that of said fixing hole 18.

The insert 50 functionally comprises at least one second part 60, called top part, which constitutes said at least one part of the insert 50 intended to be interposed between the interlayer 40 and one of said sheets 20, 30 of glass, i.e. the outer sheet of glass 20 or the inner sheet of glass 30.

Depending on the design of the laminated glazing 10, at least the top part 60, even all, of the insert 50 is interposed between the interlayer 40 and an outer or inner one of said sheets of glass 20, 30.

As will have been understood, the feature whereby all of the insert 50 or only the top part 60 of the insert 50 is interposed between the interlayer 40 and an outer or inner one of said sheets of glass 20, 30, is notably a function of the fact that the insert 50 is incorporated in a glazing 10 of asymmetrical or symmetrical type and, in particular, according to the height of all or a part of the interlayer 40 covering the fixing part 16.

Advantageously, at least a part of the insert 50 is therefore included in the glazing 10. The insert 50 consequently extends at least partially inside the glazing 10, that is to say between the outer sheet of glass 20 and the inner sheet of glass 30, to reinforce the attachment to the link means by virtue of which the drawbacks of the prior art are resolved and the safety requirements are satisfied, notably in the event of impacts.

By virtue of such an insert 50, the strength of the glazing 10 is reinforced at the fixing part 16 in the event of breakage or cracking of at least the outer sheet of glass 20 forming the fixing part 16, such that the laminated glazing 10 is retained by the insert 50 at the link means.

Advantageously, an insert 50 according to the invention makes it possible to increase the safety of use of a laminated glazing 10 as side glazing by notably avoiding the glazing 10 being able to be converted into a projectile, more particularly when said glazing 10 is mounted in a frameless door.

In the first embodiment, the laminated glazing 10 of asymmetrical type comprises at least one insert 50 which is preferentially interposed between the interlayer 40 and the outer sheet of glass 20.

In a variant not represented, the laminated glazing 10 comprises at least one insert 50 which is interposed between the interlayer 40 and the inner sheet of glass 30, that is to say on the side opposite the interlayer 40 compared to the first embodiment.

In the first embodiment, the laminated glazing 10 comprises two fixing parts 16. Preferably, the laminated glazing 10 comprises at least one insert 50 in each of the fixing parts 16, respectively situated at the front and at the rear in the non-visible part 14 of the glazing 10.

In a variant not represented, the laminated glazing 10 comprises two inserts associated with at least one or with each of the fixing parts 16, for example a first insert interposed between the interlayer 40 and the outer sheet of glass 20 and a second insert interposed between the interlayer 40 and the inner sheet of glass 30.

Advantageously, the glazing 10 comprises a first insert 50 which is associated with the fixing part 16 situated at the rear and a second insert 50 which is associated with the fixing part 16 situated at the front.

Figure 4:
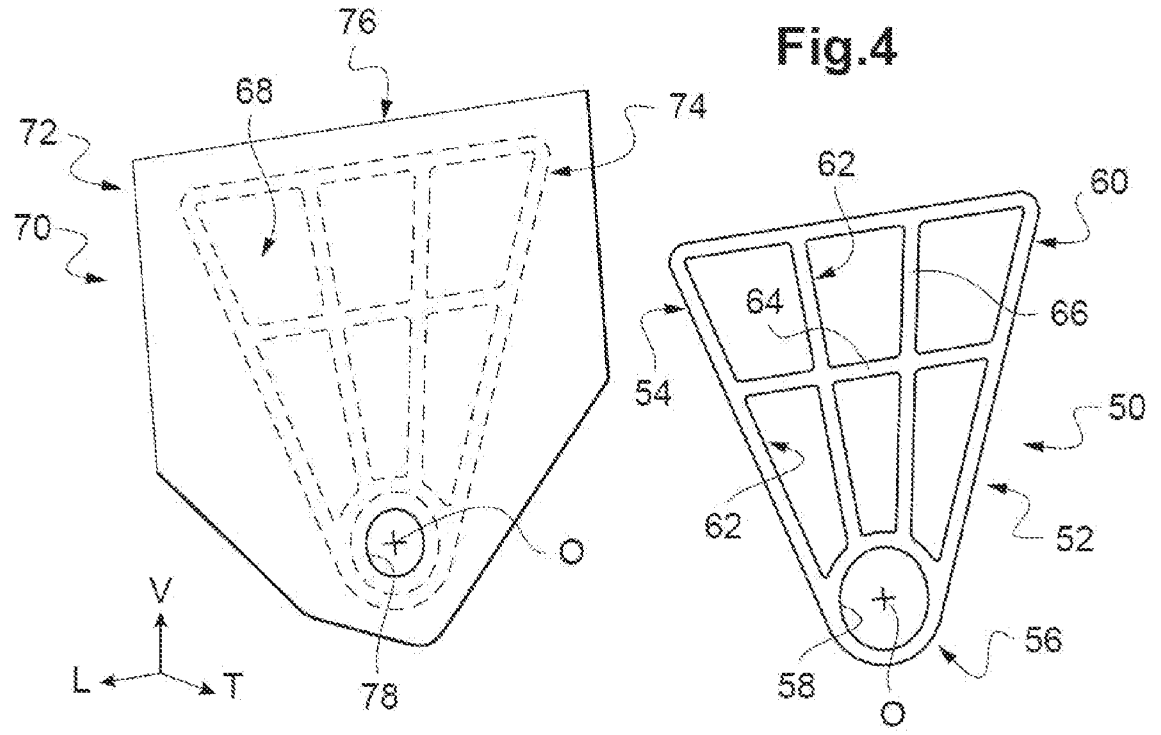
FIG. 4 is an exploded perspective view which represents the insert and the patch intended to be arranged in the rear one of the two fixing parts of the laminated glazing according to FIGS. 1 to 3 and which illustrates in detail an exemplary production of such an insert and of a patch each comprising an orifice configured to be aligned on the fixing hole of the rear fixing part, said insert comprising a part that is holed with apertures which is intended to extend at least partly inside the glazing, at least in the part of the non-visible zone which is contained between the limit of visibility and the bottom edge of the inner sheet of glass.
Figure 5:
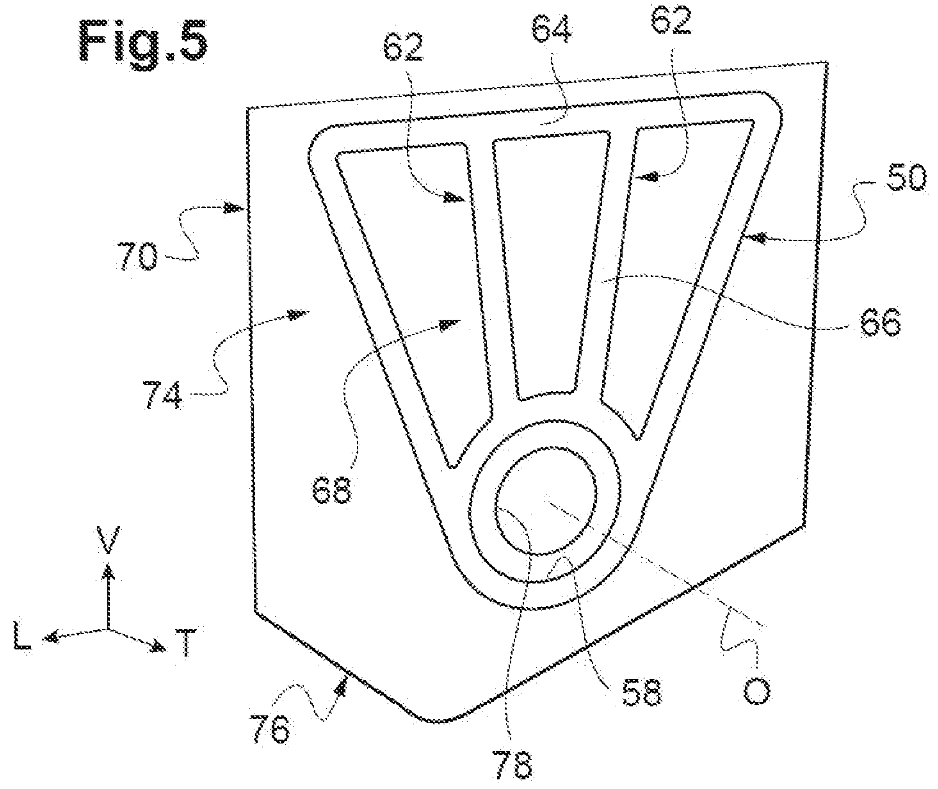
FIG. 5 is a perspective view which represents the insert and the patch intended to be arranged in the front one of the two fixing parts of the laminated glazing according to FIGS. 1 to 3 and which illustrates in detail an exemplary production of such an insert which is similar to the insert of FIG. 4, the insert comprising an orifice and a part holed with apertures.

As can be seen by comparing them to FIG. 3, the first insert 50 illustrated in detail in FIG. 4 and the second insert 50 illustrated in FIG. 5 are, here, not totally identical to one another. However, the second insert 50 has, functionally, the same characteristics as the first insert 50 and is distinguished therefrom by a top part 60 of more reduced dimensions.

That is why the description of the insert 50 which has just been given applies equally for the first insert situated at the rear and for the second insert situated at the front.

Preferably, the first insert 50 and the second insert 50 are, here, parts which are totally independent of one another. In a variant not represented, the first insert 50 and the second insert 50 are linked to one another.

The characteristics of the insert 50 according to the exemplary embodiment illustrated in FIGS. 4 and 5 will be described more particularly hereinbelow.

Advantageously, the top part 60 of the insert 50 comprises at least one aperture 62. Preferably, the top part 60 of the insert 50 comprises a plurality of apertures 62 so as to form a holed part.

In the exemplary embodiment, the top part 60 of the insert 50 comprises apertures 62 each respectively delimited by one or more bars 64 of longitudinal orientation and one or more bars 66 of vertical orientation.

Advantageously, the apertures 62 formed in the top part 60 of the insert 50 are configured to form a grating.

Each of the apertures 62 formed in the top part 60 of the insert 50 makes it possible to obtain, through said at least one part 60 of the insert, a fixing area 68 between the interlayer 40 and, directly or indirectly, the adjacent sheet of glass, in other words here, the outer sheet of glass 20 in the first embodiment.

In a variant not represented, the insert 50 has no aperture 62 so that the top part 60 is solid and not holed.

Preferably, the top part 60 of the insert 50 extending in the glazing, between the interlayer 40 and an outer or inner one of said sheets of glass 20, 30, has a surface area which is greater than that of the opposite bottom part 56 comprising said orifice 58.

Such a surface characteristic of the insert 50 offers a very particular benefit when the non-visible zone 14 is of reduced dimension, in order to increase the part of the insert 50 which is incorporated inside the glazing 10.

As illustrated in FIGS. 4 and 5, said insert 50 has a form, for example triangular, which widens between the bottom end comprising said orifice 58 and the top end of said at least one top part 60 of the insert 50.

Advantageously, the insert 50 is a thin part, such as a plate.

Preferably, the insert 50 has a thickness that is substantially constant, from its pierced bottom part 56 to its holed top part 60.

In a variant not represented, the thickness of the insert 50 is not constant, the bottom part 56 having a greater thickness than that of the top part 60, notably when the insert 50 is not entirely covered for example by the interlayer 40.

Advantageously, the insert 50 has a thickness "e" of between 0.03 and 0.35 mm, preferably a thickness "e" of between 0.05 mm and 0.2 mm.

For a laminated glazing 10 used as side glazing, the thickness "e20" of the outer sheet of glass 20 lies, for example, between 1.5 mm and 5 mm, preferentially between 2.85 mm and 4.85 mm.

When the inner sheet of glass 30 has a more reduced thickness than the outer sheet of glass 20, the thickness "e30" of the inner sheet of glass 30 lies, for example, between 1.0 mm and 3 mm, preferentially between 1.1 mm and 2.6 mm.

The sheet of polymer material forming the interlayer 40 has a thickness "e40", for example of between 0.3 mm and 1.2 mm, preferentially between 0.5 mm and 0.9 mm.

By comparing the various thicknesses which have just been given by way of nonlimiting examples, it will be noted that the insert 50 has a very reduced thickness "e" which is able to allow it to be perfectly incorporated in the stack of the different sheets forming the laminated glazing 10.

As notably illustrated in FIGS. 3 to 6, the insert 50 is formed by a thin plate having, according to the transverse orientation, said thickness "e" preferably substantially constant.

Figure 6:
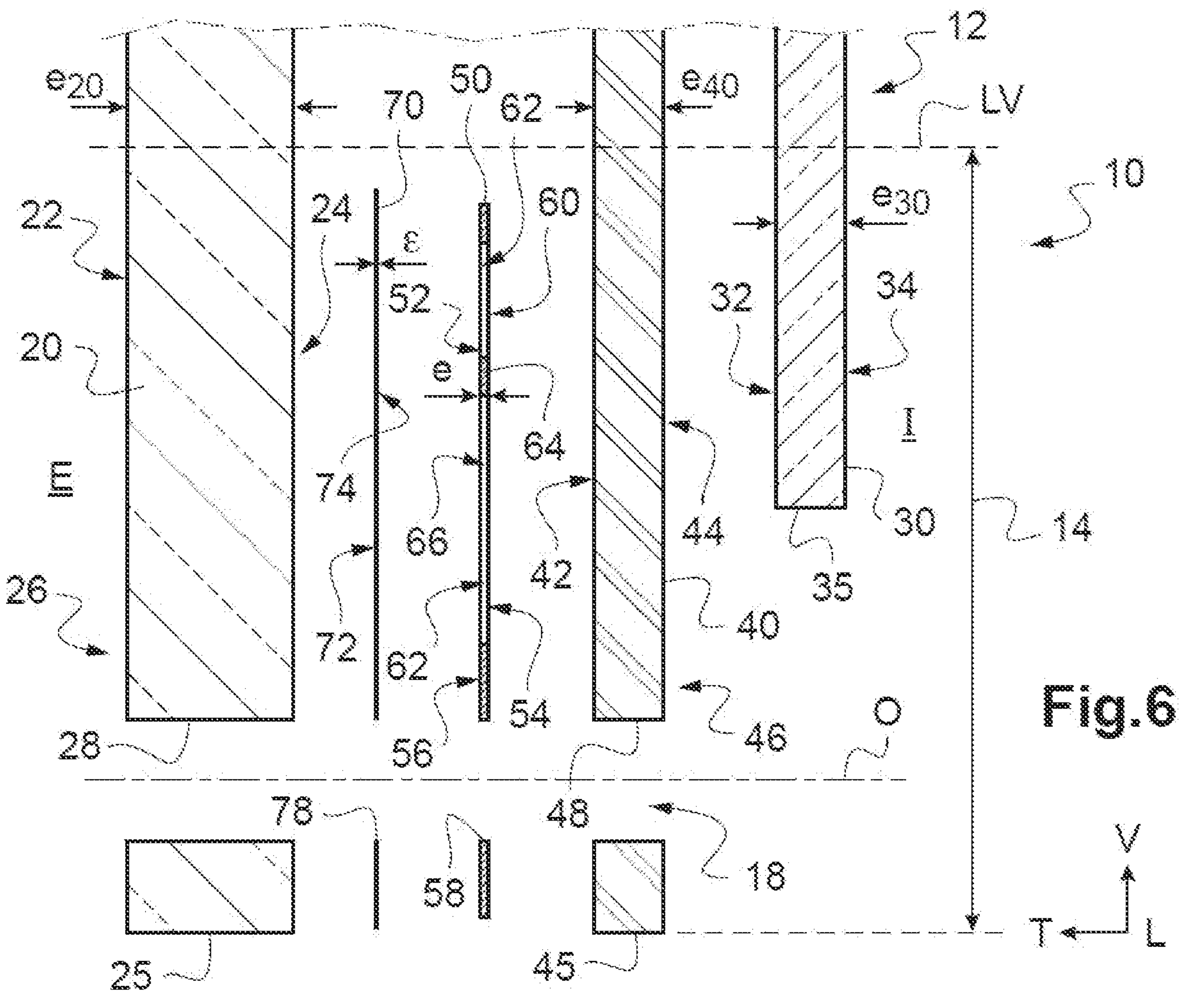
FIG. 6 is a vertical cross-sectional view of the rear fixing part of the laminated glazing according to the plane VI-VI represented in FIG. 1 which represents more particularly, in an exploded view, the non-visible part of said glazing and which illustrates in detail according to the first embodiment, an insert juxtaposed with the interlayer on the side of the outer sheet of glass with which there is associated a patch which is interposed between the insert and said outer sheet of glass.

In FIG. 6 notably and in order to allow the representation thereof, the insert 50 is not represented to scale, that is to say is represented with a thickness "e" which is proportional with respect to those of the sheets forming the laminated glazing 10.

Preferably, the insert 50 is a part made of plastic material, for example of polyethylene terephthalate (PET) or even of metal, for example steel.

The material of the insert 50 is determined according to the applications so as to make it possible to locally increase the strength, which tearing strength is consequently advantageously greater than that of the interlayer 40 formed, for example, by a sheet of polyvinylbutyral (PVB).

According to the invention, the function of the insert 50 is to transmit the forces to the link means (not represented) so as to guarantee the retention of the laminated glazing 10, said forces being oriented orthogonally to the axis O of the fixing hole.

By virtue of such an insert 50, the glazing 10 can be retained by the link means in particular in the event of breakage, following one or more impacts, occurring at the fixing part 16 formed by at least the outer sheet of glass 20.

Advantageously, the incorporation of at least one insert 50 in the glazing 10 makes it possible to increase the safety of use thereof, more particularly as side glazing for a door.

The insert 50 makes it possible to avoid the glazing 10 being able to be transformed into a projectile, notably but not exclusively when the glazing 10 is mounted in a frameless door.

According to a feature of the first embodiment, the glazing 10 comprises at least one part 70 which is associated with the insert 50 in order to perfect the cohesion within the glazing 10.

Advantageously, said part 70 forms a patch and will be designated in a nonlimiting manner by this term hereinafter in the description.

The patch 70 is interposed between said insert 50 and the outer sheet of glass 30, a patch 70 being disposed at each fixing part 16 of the glazing 10.

More particularly illustrated in FIGS. 4 and 5, the patch 70 comprises an outer face 72 and an inner face 74.

As notably illustrated by FIG. 6, the outer face 72 of the patch 70 is intended to be in contact with the inner face 24 of the outer sheet of glass 20 and its inner face 74 is intended to be in contact with the outer face 52 of the insert 50.

Preferably, the patch 70 is made of polymer material, for example formed by a film of polyvinylbutyral (PVB).

Advantageously, the patch 70 has a thickness "r" which is between 0.03 mm and 0.15 mm, preferentially between 0.05 mm and 0.1 mm.

The patch 70 is delimited by a perimeter 76 whose form is notably determined according to that of the fixing part 16 and of the insert 50.

Preferably and as illustrated in FIGS. 4 and 5, the surface area of the patch 70 is greater than that of the insert 50 so as to cover all of said insert 50, both the bottom part 56 and the top part 60.

Advantageously, the patch 70 makes it possible to improve the cohesion of the assembly, between the inner face 24 of the outer sheet of glass 20 and the outer face 52 of the insert 50, both at the bottom part 56 and the top part 60 of the insert 50.

The patch 70 notably makes it possible to perfect the cohesion in the fixing areas 68 when the insert 50 comprises apertures 62 formed in the top part 60, the patch 70 being preferentially made of polyvinylbutyral (PVB) like the interlayer 40 situated facing it.

FIG. 4 shows, by dotted lines, the silhouette of the insert 50 on the patch 70 in order to represent said fixing areas 68 obtained in favor of the apertures 62.

Advantageously, the patch 70 comprises an orifice 78 which is configured to be aligned with the fixing hole 18 passed through by said link means. As for the insert 50, the orifice 78 is advantageously a circular orifice having a diameter greater than or equal to that of the fixing hole 18.

In this first embodiment, the insert 50 is interposed between the interlayer 40 and the outer sheet of glass 20 and is fully covered on either side, both on the outer side and on the inner side.

In fact, the interlayer 40, in this first embodiment, entirely covers the extension 26 to form together each fixing part 16 of the glazing 10.

As illustrated in FIG. 6 or also by transparency in FIGS. 1 and 2, the insert 50 comprises at least one top part 60 which extends in the non-visible zone 14 covered by the inner sheet of glass 30.

Thus, said top part 60 of the insert 50 is, according to the vertical orientation, contained between the bottom edge 35 of the inner sheet of glass 30 and the limit of visibility LV.

The insert 50 is juxtaposed with the interlayer 40. The inner face 54 of the insert 50 cooperates with the outer face 42 of the interlayer 40 while the outer face 52 of the insert 50 cooperates, here indirectly through the patch 70, with the inner face 24 of the outer sheet of glass 20.

In this first embodiment, the fixing areas 68 are formed through the apertures 62 of the insert 50, between the outer face 42 of the interlayer 40 and the inner face 74 of the patch 70.

In this first embodiment, said at least one fixing part 16 of the laminated glazing 10 of asymmetrical type is not covered by the inner sheet of glass 30.

Advantageously, the fixing part 16 of the laminated glazing 10 comprises the outer sheet of glass 20, the patch 70, the insert 50 and the interlayer 40, here at least said sheet made of polymer material or, in a variant, at least one of the sheets forming an interlayer of multilayer type.

Figure 7:
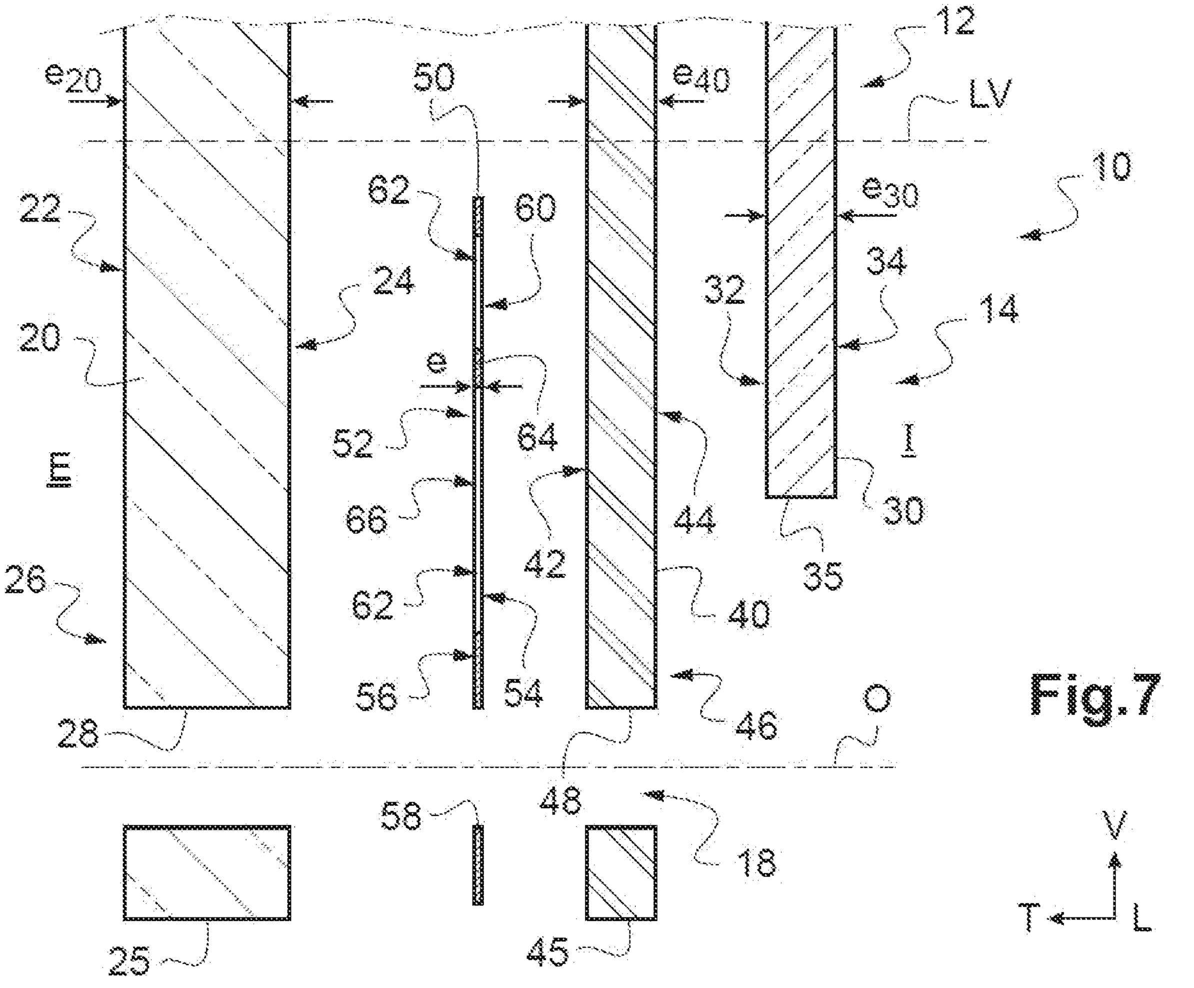
FIG. 7 is a cross-sectional view which, like FIG. 6, represents a variant production of the laminated glazing according to the first embodiment and which illustrates, by comparison, an insert without patch, said insert being respectively juxtaposed with the interlayer and the outer sheet of glass and comprising at least part interposed between the interlayer and the outer sheet of glass.

A variant which is illustrated by FIG. 7 will be described hereinbelow by comparison with the first embodiment illustrated in FIGS. 1 to 6.

In this variant embodiment, the patch 70 is eliminated.

Consequently, the outer face 52 of the insert 50 is, here, directly in contact with the inner face 24 of the outer sheet of glass 20.

In the non-visible part 14 of the glazing 10 receiving the insert 50, the outer face 42 of the interlayer 40 is also in direct contact (and not via the patch 70) with the inner face 24 of the outer sheet of glass 20 and is so through the apertures 62 that the top part 60 of the insert 50 advantageously comprises.

In the fixing part 16 of the glazing 10, the interlayer 40 is linked directly to the outer sheet of glass 20 through said apertures 62 of the insert 50 determining the fixing areas 68.

In this variant, the asymmetrical laminated glazing 10 comprises one or more fixing parts 16 that are identical to those of the first embodiment, that is to say fixing parts 16 composed of the outer sheet of glass 20, the insert 50 and the interlayer 40.

Figure 8:
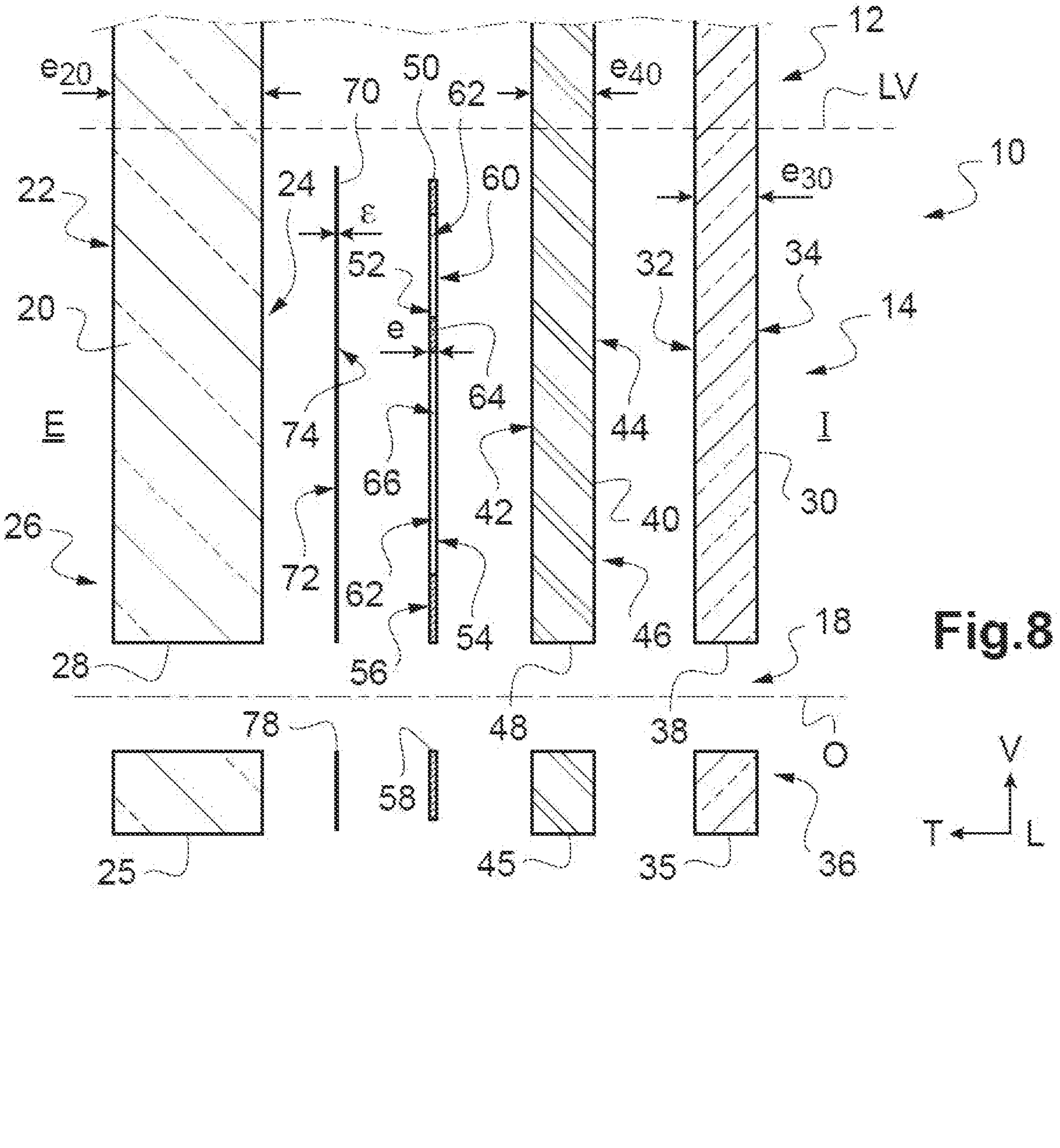
FIG. 8 is a cross-sectional view which, like FIGS. 6 and 7, represents a second embodiment of the laminated glazing and which, by comparison with the first embodiment, illustrates the fixing part of a laminated glazing of symmetrical type in which the inner sheet of glass covers the interlayer and the outer sheet of glass and comprising at least one insert, associated or not associated with a patch.

A second embodiment which is illustrated by FIG. 8 will be described hereinbelow by comparison with the first embodiment illustrated in FIGS. 1 to 6.

In this second embodiment, the laminated glazing 10 is a glazing of symmetrical type (and not asymmetrical type).

In fact, while the present invention is advantageously applicable to a laminated glazing 10 of asymmetrical type, the invention is in no way limited thereto and could also be applied in a laminated glazing 10 of symmetrical type.

The invention could in particular be applied to secure the attachment of a symmetrical laminated glazing also having outer and/or inner sheets of glass of reduced thickness.

The inner sheet of glass 30 has the same height as the interlayer 40 and the outer sheet of glass 20.

As illustrated in the cross section of FIG. 8, the bottom edge 35 of the inner sheet of glass 30 is at the same level as the bottom edge 45 of the interlayer 40 or even the bottom edge 25 of the outer sheet of glass 20, all of said edges advantageously having an identical profile.

In this second embodiment, and contrary to the first embodiment, the fixing part 16 is covered by the inner sheet of glass 30.

Advantageously, the inner sheet of glass 30 is therefore added to the stack which, forming said fixing part 16, then comprises the outer sheet of glass 20, the insert 50 and the interlayer 40 and preferentially a patch 70.

Like the outer sheet of glass 20, the inner sheet of glass 30 here comprises two protuberances 36 which are respectively situated at the front and at the rear of the glazing 10 for each to form said fixing parts 16 of the glazing 10.

In addition, the inner sheet of glass 30 comprises, in each of said protuberances 36, a hole 38 passing through it and having an axis which is coaxial to the axis O of the fixing hole 18 of the glazing.

Figure 9:
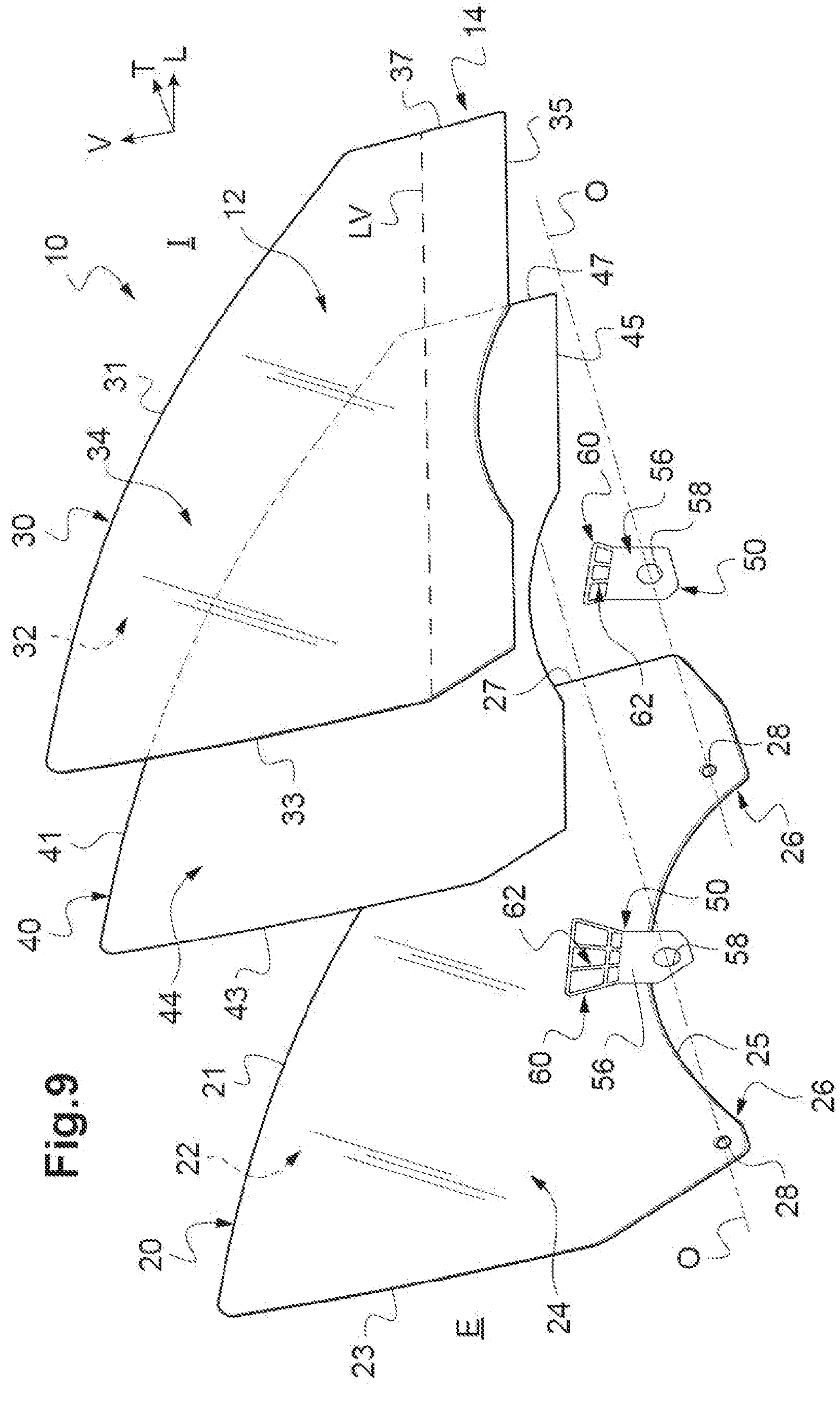
FIG. 9 is an exploded perspective view of a laminated glazing which represents a third embodiment of the laminated glazing and which, by comparison with the first embodiment, illustrates a laminated glazing of asymmetrical type in which the fixing part formed in the outer sheet of glass is not covered by the interlayer, said interlayer having a height identical to that of the inner sheet of glass and also having no fixing hole.
Figure 10:
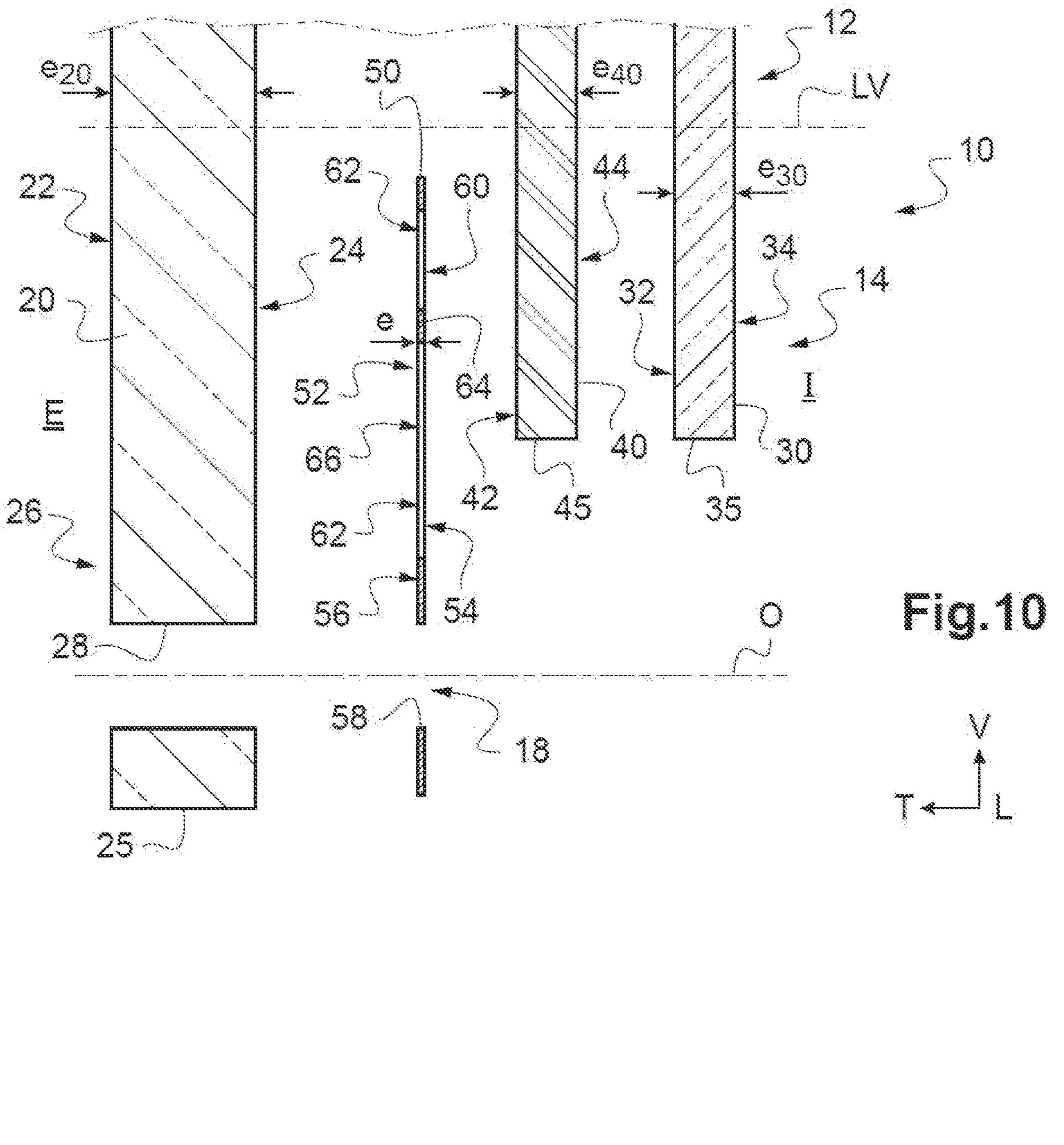
FIG. 10 is a cross-sectional view which, like FIGS. 6 and 7 or FIG. 8, is an exploded representation of a laminated glazing according to the third embodiment of FIG. 9 and which illustrates the fixing part comprising an insert of which at least a part is interposed between the interlayer and the outer sheet of glass.

A third embodiment which is illustrated by FIGS. 9 and 10 will be described hereinbelow by comparison with the first embodiment illustrated in FIGS. 1 to 6.

According to this third embodiment, the laminated glazing 10 is a glazing of asymmetrical type in which the interlayer 40 has the same height as that of the inner sheet of glass 30.

In this third embodiment, said at least one fixing part 16 of the glazing 10 essentially comprises the protuberances 26 of the outer sheet of glass 20 which are covered neither by the interlayer 40 nor by the inner sheet of glass 30.

Thus, said at least one fixing part 16 of the glazing 10 is composed of the outer sheet of glass 20 and the insert 50, here without patch 70.

In a variant not represented, a patch 70 is interposed between the insert 50 and the protuberance 26 of the outer sheet of glass 20.

According to this variant, the patch 70 makes it possible to link the bottom part 56 of the insert 50 to the inner face 24 of the outer sheet of glass 20, that is to say the part complementing the insert 50 which is not interposed between the interlayer 40 and the outer sheet of glass 20.

Preferably, the insert 50 is modified compared to that illustrated notably in FIGS. 4 and 5. Advantageously, the top part 60 intended to be juxtaposed with the interlayer 40 and which is provided with apertures 62 is in fact more reduced in height.

As illustrated in exploded view in FIG. 9, the insert 50 comprises, above the orifice 58, a top part 56 which is solid and is not covered by the interlayer 40.

Advantageously, a bonding can be made between at least said solid bottom part 56 of the insert 50 and the outer sheet of glass 20. The use of an adhesive to produce such a bonding more generally constitutes an alternative to that of a patch 70.

Although the fixing part 16 is not covered by the interlayer 40, the insert 50 comprises, in accordance with the teachings of the invention, at least a top part 60 which is interposed between the interlayer 40 and, here, the outer sheet of glass 20.

By comparison with the first embodiment, the insert 50 is therefore not here fully contained within the stack of the laminated glazing 10, only said holed top part 60 being so included.

As illustrated in FIG. 10, said top part 60 of the insert 50 extends according to the vertical orientation between the bottom edge 45 of the interlayer (or the bottom edge 35 of the inner sheet of glass 30) and the limit of visibility LV.

Hereinbelow is a more general description of the advantages obtained with the inclusion of at least one insert 50 according to the invention in a laminated glazing 10, more particularly a laminated glazing 10 intended to be used as side glazing in a motor vehicle door.

In the event of significant impacts, for example in an accident, the forces applied notably at the fixing part 16 of the glazing 10 and more particularly around the fixing hole 18 receiving the link means with the driving device can provoke the breakage of at least the outer sheet of glass 20 constituting, according to the embodiments, said fixing part 16.

By virtue of the insert 50, preferentially associated with a patch 70, the laminated glazing 10 is then secured so as to guarantee that the glazing 10 remains attached to the link means and cannot be detached therefrom with the risk of being transformed into a projectile.

The securing of the laminated glazing 10 obtained results from the intervention of the insert 50 as a whole in the event of impacts, the insert 50 making it possible to transfer the forces being then applied to said link means.

On the one hand, it is important for the bottom part 56 of the insert 50 to remain attached to said link means passing through it through the orifice 58 when the outer sheet of glass 20 has been broken at its protuberance 26 forming said fixing part 16.

Advantageously, the material employed for the insert 50 is therefore chosen to obtain a mechanical resistance, in particular to tensile forces, and despite a small thickness "e" designed to allow the incorporation of the insert 50 in the stack when manufacturing the laminated glazing 10.

On the other hand, said at least one top part 60 of the insert 50 which is interposed between the interlayer 40 and the outer sheet of glass 20 (and/or, in a variant, the inner sheet of glass 30) helps to retain the glazing 10 as a whole because of its inclusion within it.

Advantageously, said at least one top part 60 of the insert 50 extends only in the non-visible part 14 of the glazing 10 situated under the limit of visibility LV so that that in no way affects the general esthetic of the glazing 10.

The invention claimed is:

1. A laminated glazing for a motor vehicle, said laminated glazing comprising at least one outer sheet of glass and one inner sheet of glass joined together by an interlayer which comprises at least one sheet made of a polymer material, in which a visible zone and a non-visible zone of the laminated glazing which extend on either side of a limit of visibility and comprising, in said non-visible zone situated below the limit of visibility, at least one fixing part which comprises at least one fixing hole which is intended to receive link means with a driving device of said glazing and at least one insert which comprises an orifice configured to be aligned with said fixing hole, wherein said insert comprises at least one part and (i) a first main face that is in contact with and laminated to a main face of the interlayer and (ii) a second main face opposite the first main face, the insert being interposed between the interlayer and a selected sheet of glass of the outer or inner sheet of glass such that the second main face is in contact with and laminated to either (A) a main face of the selected sheet of glass or (B) a patch laminated to said main face of the selected sheet of glass, whereby the first and second main faces of said insert are sandwiched between the interlayer and the selected sheet of glass, wherein (i) the first main face of the insert is completely covered by the main face of the interlayer or (ii) the second main face of the insert is completely covered by the main face of the selected sheet of glass, or both (i) and (ii), and wherein said outer sheet of glass, optionally said patch, said insert, said interlayer and inner sheet of glass are stacked along a transverse direction that extends along a thickness of the laminated glazing.

2. The laminated glazing as claimed in claim 1, wherein said at least one part of the insert extends in the non-visible zone covered by the inner sheet of glass.

3. The laminated glazing as claimed in claim 1, wherein said at least one part of the insert is juxtaposed with the interlayer.

4. The laminated glazing as claimed in claim 1, wherein said at least one part of the insert extends parallel to an inner face of an outer or inner one of said inner and outer sheets of glass.

5. The laminated glazing as claimed in claim 1, wherein said at least one part of the insert comprises at least one aperture so as to obtain, through said at least one part of the insert, at least one fixing area between the interlayer and the outer sheet of glass or the inner sheet of glass, directly or indirectly adjacent to the interlayer.

6. The laminated glazing as claimed in claim 1, wherein said at least one part of the insert extending in the glazing, between the interlayer and one of the outer or inner of said sheets of glass, has a surface area which is greater than that of an opposite part comprising said orifice.

7. The laminated glazing as claimed in claim 1, wherein said at least one part of the insert has a thickness of between 0.03 mm and 0.35 mm.

8. The laminated glazing as claimed in claim 1, wherein said insert is made of plastic material or of metal.

9. The laminated glazing as claimed in claim 1, wherein the orifice of said insert is a circular orifice, said circular orifice having a diameter which is greater than or equal to that of said fixing hole passed through by said link means.

10. The laminated glazing as claimed in claim 1, comprising said patch laminated to said main face of the selected sheet of glass.

11. The laminated glazing as claimed in claim 10, wherein said patch is made of polymer material.

12. The laminated glazing as claimed in claim 10, wherein said patch comprises an orifice configured to be aligned with the fixing hole passed through by said link means.

13. The laminated glazing as claimed in claim 1, wherein said at least one fixing part of the glazing comprises at least the outer sheet of glass, not covered by the interlayer and by the inner sheet of glass.

14. The laminated glazing as claimed in claim 1, wherein said at least one fixing part of the glazing comprises at least the outer sheet of glass and at least one of the sheets forming said interlayer, respectively not covered by the inner sheet of glass.

15. The laminated glazing as claimed in claim 1, wherein said at least one fixing part of the glazing comprises the outer sheet of glass, the interlayer and the inner sheet of glass.

16. The laminated glazing as claimed in claim 1, wherein the laminated glazing is adapted to be slidingly mounted in a door of the vehicle.

17. The laminated glazing as claimed in claim 7, wherein the thickness is between 0.05 mm and 0.2 mm.

18. The laminated glazing as claimed in claim 8, wherein said plastic material is polyethylene terephthalate (PET) and the metal is steel.

19. The laminated glazing as claimed in claim 11, wherein said polymer material is a film of polyvinylbutyral (PVB).

20. The laminated glazing as claimed in claim 1, wherein both (i) the first main face of the insert is completely covered by the main face of the interlayer and (ii) the second main face of the insert is completely covered by the main face of the selected sheet of glass.

21. The laminated glazing as claimed in claim 1, wherein the first and second main faces of said insert are sandwiched between the interlayer and the selected sheet of glass in a thickness direction of the laminated glazing.

* * * * *